United States Patent [19]
Tirabassi et al.

[11] Patent Number: 6,073,023
[45] Date of Patent: Jun. 6, 2000

[54] COMMUNICATIONS SYSTEM HAVING PRE-DEFINED CALLING GROUP

[75] Inventors: Karen Tirabassi, Howell, N.J.;
Andrew Goldberg, Bala Cynwyd;
Greg Butz, Phoenixville, both of Pa.;
Patrick Melampy, Pepperell, Mass.;
Mary Stanhope, Arlington, Mass.;
Andrew Coppola, Boston, Mass.

[73] Assignee: Comcast Cellular Communications, Inc., Wayne, Pa.

[21] Appl. No.: 09/004,106

[22] Filed: Jan. 7, 1998

Related U.S. Application Data

[60] Provisional application No. 60/037,634, Jan. 15, 1997.

[51] Int. Cl.[7] ............................................. H04B 7/00
[52] U.S. Cl. .......................... 455/518; 455/433; 455/435
[58] Field of Search .................................... 455/432, 433, 455/434, 435, 428, 426, 519, 418, 455, 458

[56] References Cited

U.S. PATENT DOCUMENTS

| | | |
|---|---|---|
| 4,748,655 | 5/1988 | Thrower et al. . |
| 4,908,848 | 3/1990 | Hanawa . |
| 5,200,995 | 4/1993 | Gaukel et al. . |
| 5,203,009 | 4/1993 | Bogusz et al. . |
| 5,235,631 | 8/1993 | Grube et al. . |
| 5,353,332 | 10/1994 | Raith et al. . |
| 5,365,570 | 11/1994 | Boubelik . |
| 5,375,161 | 12/1994 | Fuller et al. . |
| 5,437,054 | 7/1995 | Rappaport et al. . |
| 5,487,108 | 1/1996 | Atkins et al. . |
| 5,506,837 | 4/1996 | Söllner et al. . |
| 5,512,884 | 4/1996 | Hesse et al. . |
| 5,512,885 | 4/1996 | Agestam et al. . |
| 5,519,884 | 5/1996 | Duque-Anton et al. . |
| 5,535,257 | 7/1996 | Goldberg et al. . |
| 5,535,431 | 7/1996 | Grube et al. . |
| 5,548,631 | 8/1996 | Krebs et al. . |
| 5,561,706 | 10/1996 | Fenner . |
| 5,588,037 | 12/1996 | Fuller et al. . |
| 5,722,067 | 2/1998 | Fougnies et al. ........................ 455/406 |
| 5,758,291 | 5/1998 | Grube et al. ............................ 455/518 |
| 5,862,480 | 1/1999 | Wild et al. .............................. 455/432 |
| 5,915,220 | 6/1999 | Chelliah .................................. 455/435 |
| 5,924,030 | 7/1999 | Rautiola et al. ........................ 455/426 |
| 5,924,035 | 7/1999 | Joensuu .................................. 455/445 |

*Primary Examiner*—Darnell Armstrong
*Attorney, Agent, or Firm*—Brinks Hofer Gilson & Lione

[57] ABSTRACT

A communications system having a pre-defined calling group with a plurality of members is disclosed. A plurality of personal communication devices (PCDs) each have a system ID and a group ID, and each member of the group is assigned one of the PCDs. The system ID and the group ID both have a predetermined characteristic, where each system ID has a first variation thereof and each group ID has a second variation. A first group member having a first PCD contacts a second member having a second PCD by entering into the first PCD the second PCD group ID. The first PCD transmits the first PCD system ID and the second PCD group ID to a communications switch. Based on the first PCD system ID, the communications switch locates a record for the first PCD in a switch database and determines therefrom that the first PCD can contact the second PCD by way of the second PCD group ID. A group database in switchable communication with the communications switch has the system ID and group ID for each group member PCD. The communications switch forwards the contact and the second PCD group ID to the group database for further processing. The group database determines that the second PCD group ID is located therein, locates the second PCD system ID based on the second PCD group ID, and forwards the attempted contact and the second PCD system ID to an appropriate communications switch for further processing.

18 Claims, 4 Drawing Sheets

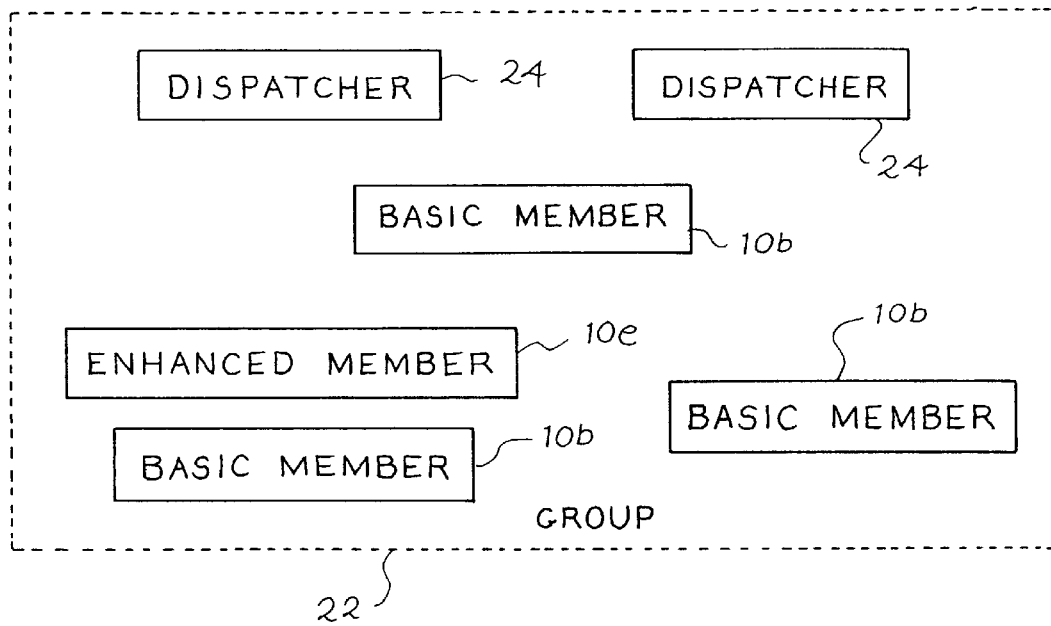
Fig. 3
Fig. 5
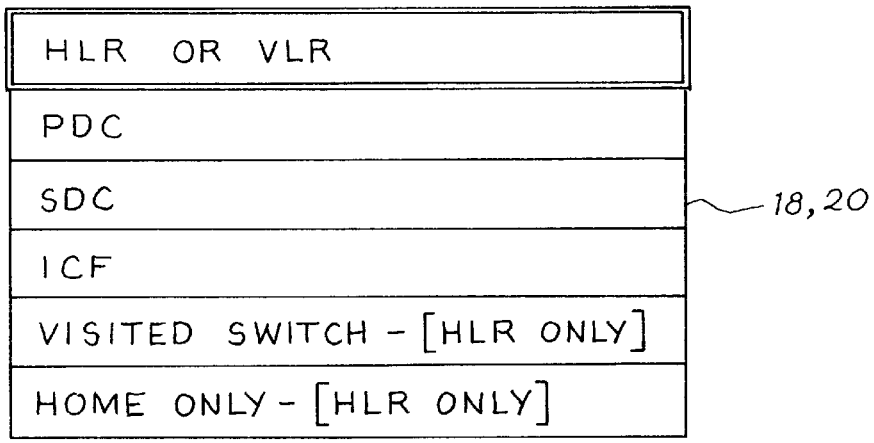

COMMUNICATIONS SYSTEM HAVING PRE-DEFINED CALLING GROUP

CROSS-REFERENCE TO RELATED APPLICATIONS

This application claims the benefit of U.S. Provisional Application No. 60/037,634 filed Jan. 15, 1997 and incorporated herein by reference.

BACKGROUND OF THE INVENTION

The present invention relates generally to a communications system having pre-defined restricted user groups. More particularly, the present invention relates to a cellular telephone system wherein at least some group members within such a pre-defined group are restricted to making telephone calls to and receiving telephone calls from other group members only.

Many organizations have work forces spread out over a relatively wide geographic area. Such work forces and organizations may for example be: drivers for a hauling concern, an ambulance company, a courier company, or the like; work crew members for an electric, cable, or water utility or the like; salespersons for a sales company or the like; service technicians for a copier repair firm, computer repair firm, or the like; repair and maintenance technicians for a climate control service firm, a plumbing or electrical service firm, or the like; roving laborers for a contractor or the like; or security officers for a security firm, private security force, or the like, among others. In most if not all cases, the organizations would prefer to be in close communication with such work force workers.

Previously, such organizations could only maintain such close contact by building and operating their own private radio communications systems or by contracting with radio communications system service providers. As should be understood, such private systems are quite costly. With the advent of widely available cellular telephone service, however, many organizations have found it advantageous to provide at least some of their work force workers with cellular telephones ("cell phones"). Accordingly, workers, dispatchers, supervisors, and other appropriate personnel can conveniently and easily contact one another, as the case may be. Moreover, such organizations need not expend the costs associated with maintaining or contracting for private radio communications systems.

As should be evident, with the provided cell phone, each worker can make calls to and receive calls from work-related individuals for work-related purposes. However, each worker may also use the provided cell phone to contact nonwork-related individuals for non-work-related purposes. As should be understood, such non-work-related uses may prove to be quite costly and are at any rate considered undesirable. A need exists, then, for a cellular telephone system that prevents at least some workers from using provided cell phones for non-work-related uses.

BRIEF SUMMARY OF THE INVENTION

In a preferred embodiment of the present invention, the aforementioned need is satisfied by a communications system having a pre-defined calling group with a plurality of members. In particular, in the present invention, a plurality of personal communication devices (PCDs) each have a system ID and a group ID, and each member of the group is assigned one of the PCDs. The system ID and the group ID both have a predetermined characteristic, where each system ID has a first variation with respect to the characteristic and each group ID has a second variation with respect to the characteristic. A first member of the group having a first PCD, then, attempts to contact a second member of the group having a second PCD by entering into the first PCD the group ID of the second PCD.

A communications switch allows the first PCD to access the communications system thereby. The first PCD transmits information to the communications switch, where the transmitted information includes the system ID of the first PCD and the group ID of the second PCD. A switch database is in communication with the communications switch, and includes a record for the first PCD. The record includes information that the first PCD is assigned to a member of the group. The communications switch locates the record for the first PCD based on the system ID of the first PCD, and determines based on the record for the first PCD that the first PCD is allowed to contact the second PCD by way of the group ID of the second PCD.

A group database is in switchable communication with the communications switch. The group database has the system ID and the group ID for the PCD of each member of the group. The communications switch forwards the attempted contact and the group ID of the second PCD to the group database for further processing. The group database determines that the group ID of the second PCD is located therein, locates the system ID of the second PCD based on the group ID of the second PCD, and forwards the attempted contact and the system ID of the second PCD to an appropriate communications switch for further processing.

In a preferred embodiment of the present invention, the calling group has a plurality of members including restricted members and non-restricted members. Each restricted member is restricted to contacting non-restricted members and other restricted members within the group. Each non-restricted member is able to contact restricted members, other non-restricted members, and non-group individuals. The record for the first PCD includes a first designator designating that the first PCD is assigned to a member of the group and a second designator indicating whether the first PCD is assigned to a restricted member or a non-restricted member.

If the communications switch determines based on the record for the first PCD that the first PCD is assigned to a restricted member, the communications switch allows the attempted contact to proceed if the number of the communications device has the second variation. If the communications switch determines based on the record for the first PCD that the first PCD is assigned to a non-restricted member, the communications switch allows the attempted contact to proceed if the number of the communications device has the first or the second variation. If the communications switch determines based on the record for the first PCD that the first PCD is assigned to a non-restricted member and if the number of the communications device has the first variation, the communications switch forwards the attempted contact and the number of the communications device to an appropriate communications switch for further processing. If the communications switch determines based on the record for the first PCD that the first PCD is assigned to a restricted member or a non-restricted member and if the number of the communications device has the second variation, the communications switch forwards the attempted contact and the number of the communications device to the group database for further processing.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 3 is a block diagram of a group organized in accordance with the preferred embodiment of the present invention;

FIG. 5 is a block diagram of a home location record (HLR) or a visitor location record (VLR) in a switch database associated with one of the cellular switches shown in FIGS. 1 and 2 in accordance with the preferred embodiment of the present invention.

DETAILED DESCRIPTION OF THE INVENTION

Figure 1:
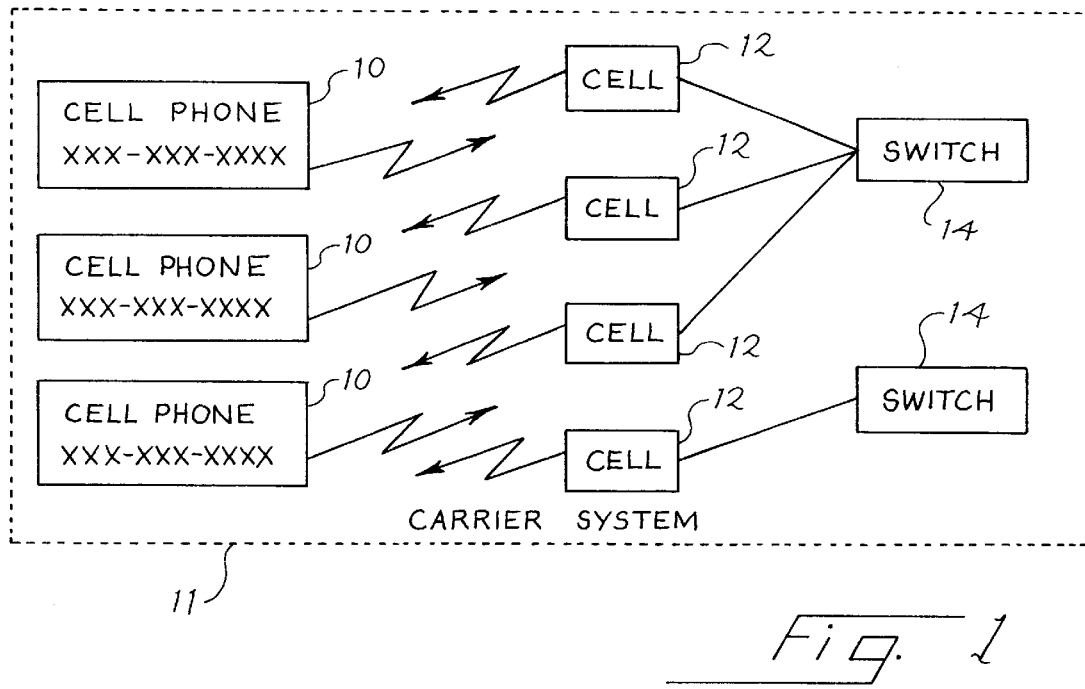
FIG. 1 is a block diagram of a cellular telephone communications system employed in the preferred embodiment of the present invention.

Certain terminology may be used in the following description for convenience only and is not limiting. The words "left", "right", "upper", and "lower" designate directions in the drawings to which reference is made. The words "inwardly" and "outwardly" are further directions toward and away from, respectively, the geometric center of a referenced object. The terminology includes the words above specifically mentioned, derivatives thereof, and words of similar importance.

Referring to FIG. 1, there is shown a cellular telephone communications carrier system 11 in accordance with a preferred embodiment of the present invention. In the carrier system 11, and as should be understood, a plurality of cell phone users each have a cell phone 10 (i.e., a 'personal communications device (PCD)), and each cell phone 10 is assigned a unique ten-digit cell phone number (three-digit area code+seven-digit number starting with a three-digit exchange) (i.e., a 'system ID' with a first variation of a length characteristic). The carrier system 11 is geographically divided into a plurality of regions, where each region has a cell facility or cell 12, and each cell 12 is assigned to a cellular switch 14.

Each cell 12 includes a cellular telephone radio transceiver for establishing two-way cellular communication with any cell phone 10 within the region of such cell 12. Each cell 12 also includes additional communication facilities for maintaining communications with one of the cellular switches 14. Such communications with the cellular switch 14 may be by land line, RF, microwave, or any other appropriate communications medium. Typically, a plurality of the cells 12 are assigned to one cellular switch 14.

Figure 2:
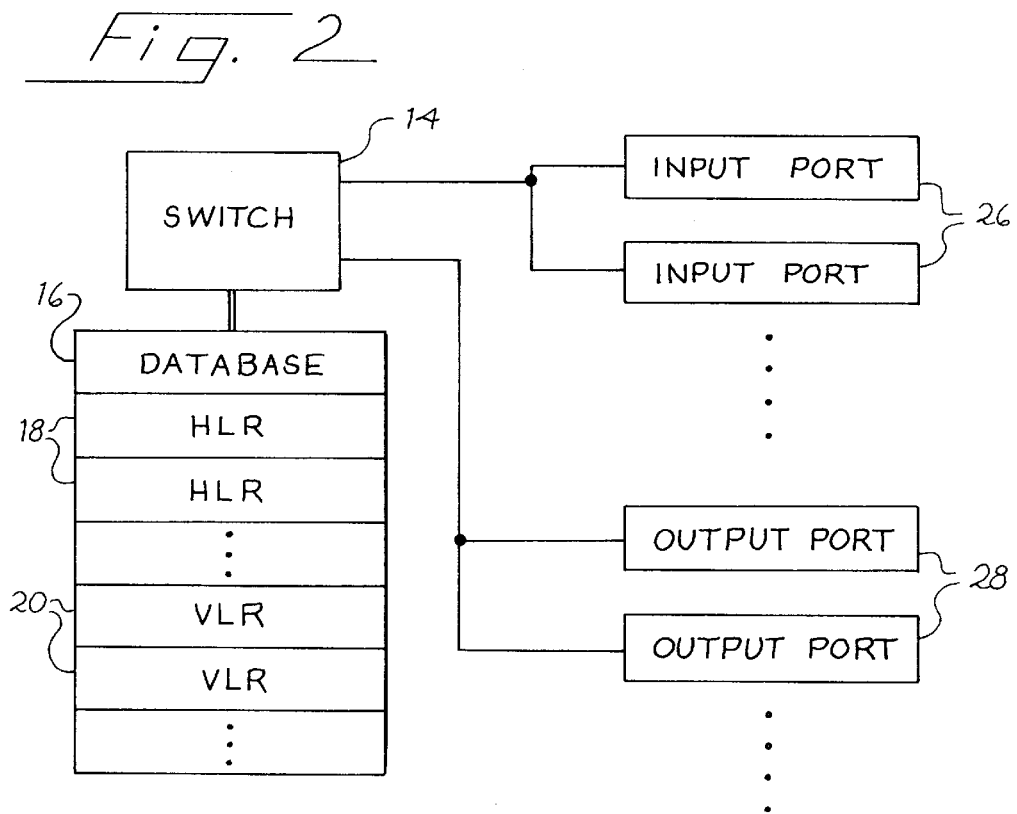
FIG. 2 is a block diagram of a cellular switch shown in FIG. 1.

Referring now to FIG. 2, each cellular switch 14 typically includes or is in communication with a switch database 16, and the switch database 16 includes a home location register (HLR) 18 for each of a plurality of cell phones 10. For any one cell phone 10 in the carrier system 11, only one cellular switch 14 in the carrier system 11 has a corresponding HLR 18. Accordingly, the cellular switch 14 with the HLR 18 for the cell phone 10 is the 'home' switch for that cell phone 10, and each cell phone 10 has only one home switch 14. The home switch 14 of the cell phone 10 is the cellular switch 14 that is contacted to determine which cellular switch 14 the cell phone 10 is registered at.

When a cell phone user first turns on his or her cell phone 10, the cell phone 10 registers with one of the cells 12. Typically, such cell 12 is the cell for the region in which the cell phone 10 is physically located, or the cell for an adjacent region if circumstances so require. As part of such registration, the cell 12 checks with its assigned cellular switch 14 to determine if the switch database 16 of such cellular switch 14 has an HLR 18 for the cell phone 10. If so, and as discussed above, such cellular switch 14 is the home switch for the cell phone 10.

If no HLR 18 for the cell phone 10 is present in the switch database 16, the cell phone 10 is a 'visitor' to such 'visited' cellular switch 14, and a visitor location register (VLR) 20 is created for the cell phone 10 in the switch database 16 of the visited switch 14. Preferably, the visited switch 14 communicates with the home switch 14 for the visiting cell phone 10, the HLR 18 for the visiting cell phone 10 is substantially copied from the switch database 16 of the home switch 14, the VLR 20 for the visiting cell phone 10 is formed in the switch database 16 of the visited switch 14 substantially based on the copied HLR 18, and the HLR 18 for the visiting cell phone 10 in the switch database 16 of the home switch 14 is updated to reflect that the cell phone 10 is registered at the visited switch 14.

Once registered with a cell 12 and a cellular switch 14, a telephone call (i.e., an attempted contact) is normally made by sending a ten-digit destination phone number from the cell phone 10 (in addition to other information) to the communications switch 14 by way of the cell 12. This assumes the call is to a U.S. or similar destination. Of course, if the call is to a non-U.S. or similar destination, the destination phone number will likely have more than ten digits. Nevertheless, the term 'ten-digit call' and the like will be used below for convenience only.

Typically, and absent any other restrictions, the ten-digit call is passed from the cellular switch 14 and through a number of other switches (not shown) until a connection is made and the call is completed between the cell phone 10 and the destination telephone corresponding to the destination telephone number, be it another cell phone 10 or a land line phone. For example, if the destination telephone number is a land line number local to the cellular switch 14, the cellular switch 14 may contact a local telephone company switch to complete the call. Correspondingly, if the destination number is a long-distance land line number, the cellular switch 14 may connect with a long-distance telephone company switch to complete the call. Of course, the cellular switch 14 need not contact any other switches if the destination telephone number is for a cell phone 10 that is home to the cellular switch 14. Typically, and as seen in FIG. 2, each cellular switch 14 (as well as every other non-cellular switch) has a number of input ports 26 and output ports 28 through which connections with other switches are achieved, and trunk lines (not shown) interconnect the communications switches by way of the input ports and output ports 26, 28.

When a call is made from the outside world to one of the cell phones 10 in the carrier system 11, the call upon reaching the carrier system 11 is initially switched to the home switch 14 for the cell phone 10. If the HLR 18 for the cell phone 10 indicates that the cell phone 10 is 'at home', the home switch 14 completes the call by way of an appropriate cell 12. Otherwise, if the HLR 18 for the cell phone 10 indicates that a VLR 20 has been created for the cell phone 10 at a visited switch 14, the home switch 14 forwards the call to the visited switch 14 for further processing and completion.

In the preferred embodiment of the present invention, and referring now to FIG. 3, at least one group 22 is formed with regard to a particular organization, where each member of the group is designated as a basic member having a basic member cell phone 10b or an enhanced member having an enhanced member cell phone 10e. Additionally, the group 22 may include one or more dispatcher members, where each dispatcher member can access any other member 10b, 10e within the group by way of a dispatcher land line phone 24.

Preferably, each member 10b, 10e, 24 of the group 22 has a pre-defined shortened number (i.e., a 'group ID' with a second variation of a length characteristic) that is used by others in the group 22 to make contact therewith. Preferably, the shortened number is a four-digit number, although one skilled in the art will recognize that other variations of number length may be employed without departing from the spirit and scope of the present invention.

Moreover, one skilled in the art will recognize that variations of other characteristics besides length may be used to differentiate system IDs from group IDs without departing from the spirit and scope of the present invention. For example, group IDs may be defined as all IDs having a pre-defined beginning or end portion, or as all IDs having a '*' or '#' as a digit, among other things. Nevertheless, the terms 'four-digit number', 'ten-digit number', and the like will be used below for convenience only.

Preferably, each basic member 10b may only make a call to a pre-defined four-digit number, and may only receive a call from an authorized inbound group member 10b, 10e, 24. Also preferably, each enhanced member 10e may make and receive four-digit (i.e., group) and ten-digit (i.e., non-group) calls. As should be understood, a basic member having a basic member cell phone 10b would typically be a worker who need only be able to communicate with other group members 10b, 10e, 24. Correspondingly, an enhanced member having an enhanced member cell phone 10e would typically be a worker who needs access to other group members 10b, 10e, 24, and also to the outside world, or should otherwise be allowed to have such access. Presumably, the enhanced member 10e can be trusted to not misuse his or her cell phone 10.

Figure 4:
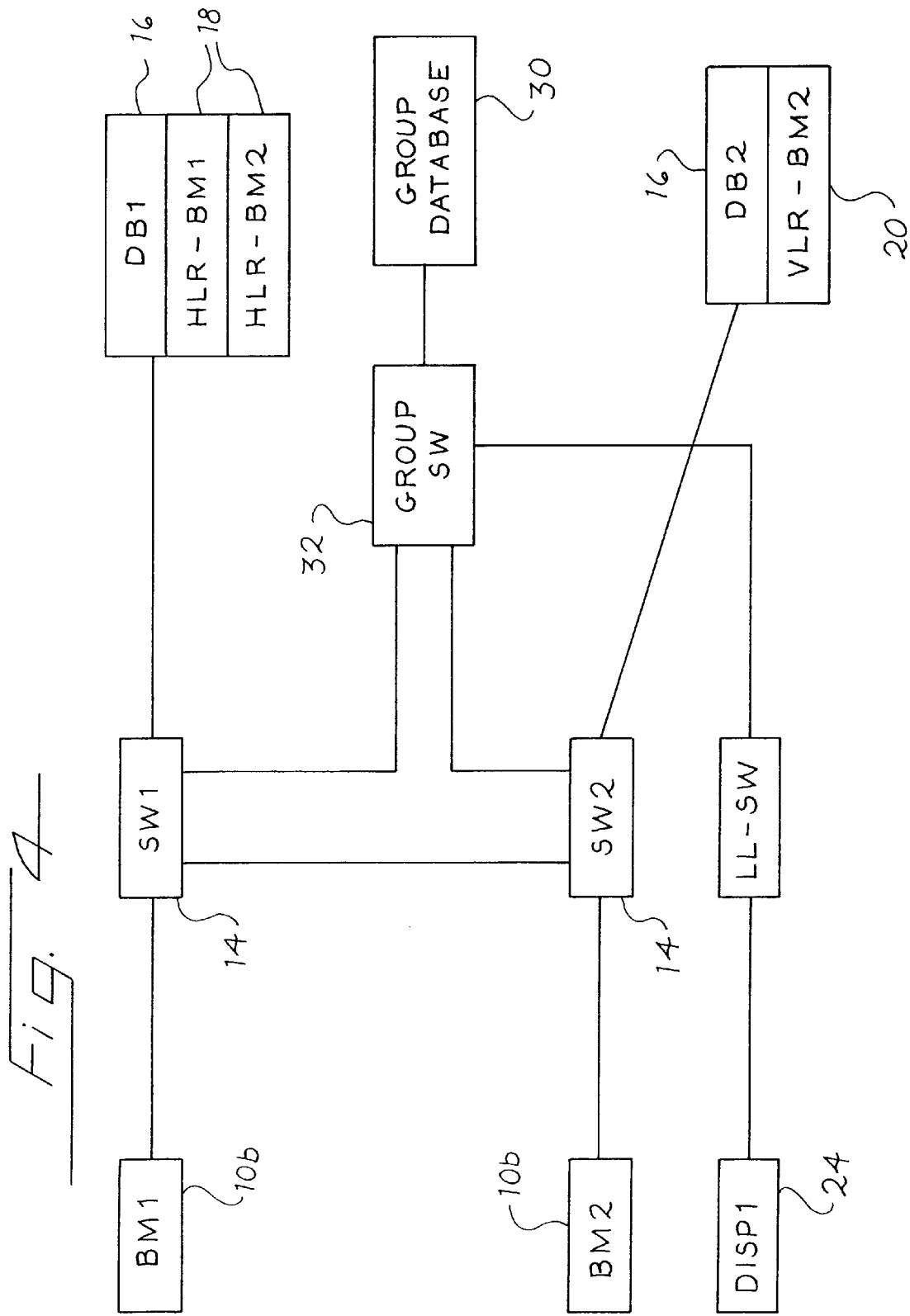
FIG. 4 is a block diagram of the cellular switches shown in FIGS. 1 and 2 and a group database in accordance with the preferred embodiment of the present invention.

Referring now to FIG. 4, there is shown an example that will be useful in describing the preferred embodiment of the present invention. As seen, a first basic member BM1 is registered to a first cellular switch SW1, a second basic member BM2 is registered to a second cellular switch SW2, and a dispatcher member DISP1 is at a land line phone available by way of a land line switch LL-SW. As also seen, the first cellular switch SW1 is the home switch for both the first basic member BM1 and the second basic member BM2, as shown by the HLR for BM1 and the HLR for BM2 in the switch database DB1 associated with the first cellular switch SW1, and the second cellular switch SW1 is the visited switch for the second basic member BM2, as shown by the VLR for BM2 in the switch database DB2 associated with the first cellular switch SW2.

One skilled in the art will appreciate that no cells 12 are shown in or discussed in connection with FIG. 4 since such cells 12 are not necessary for purposes of describing the preferred embodiment of the present invention. However, such cells 12 are still necessary in the carrier system 11. One skilled in the art will also appreciate that although direct connections are shown between the first and second cellular switches SW1, SW2 and between other switches in FIG. 4, such connections may in fact be indirect by way of other switches (not shown) without departing from the spirit and scope of the present invention.

With reference to the example shown in FIG. 4, then, a group telephone call from BM1 to BM2 is completed as follows. Preliminarily, BM1 enters the pre-defined four-digit number for BM2 into his or her cell phone 10, and then enters 'send' or the equivalent to initiate the group call. Thereafter, the cell phone 10 sends to SW1 the four-digit number for BM2 and the ten-digit number for BM1.

Based on the ten-digit number for BM1, SW1 locates the HLR 18 for BM1 in DB1. SW1 then checks such HLR to determine the kind of access that BM1 is permitted. Preferably, and referring now to FIG. 5, each HLR 18 or VLR 20 in any database 16 for any cellular switch 14 includes a primary dialing class (PDC) designator ("first designator"), and a secondary dialing class (SDC) designator ("second designator"). Additionally, the HLR 18 includes an immediate call forwarding (ICF) designator, a visited switch designator, and a home system only designator. Further, the HLR 18 or VLR 20 for any group member 10b, 10e preferably includes the tendigit number for the group member 10b, 10e, among other information (not shown). Of course, one skilled in the art will realize that the elements included in the HLR 18 or VLR 20 may vary without departing from the spirit and scope of the present invention so long as the HLR 18 or VLR 20 provides the information necessary for the operability of the present invention, as described below.

The PDC for the HLR 18 or VLR 20 for any group member 10b, 10e is set to indicate that the group member 10b, 10e is indeed a member of a group 22. The SDC for the HLR 18 or VLR 20 for any group member 10b, 10e is set to indicate whether a group member is a basic member 10b or an enhanced member 10e. When the SDC is set to indicate that a group member is a basic member 10b, calls made from the basic member 10b are forwarded to a group database 30 (shown in FIG. 4) for further processing. The ICF for the HLR 18 for any basic member 10b is set to indicate that calls made to the basic member 10b are to be forwarded to the group database 30 for further call processing. The visited switch designator for the HLR 18 for any group member 10b, 10e indicates whether a VLR 20 exists at a visited cellular switch 14, and which cellular switch 14. The home system only designator for the HLR 18 for any group member 10b, 10e indicates whether the group member 10b, 10e can visit at cellular switches 14 at other carrier systems 11. Preferably, the home system only designator for each basic member 10b is set to prevent a VLR 20 from being created for the member 10b outside the carrier system 11. Accordingly, a basic member 10b is prevented from using the cell phone 10 outside the carrier system 11. As should be understood, by referring to the HLR 18 or VLR 20 for any group member 10b, 10e, a cellular switch 14 determines how to handle any call involving such group member 10b, 10e.

Since the HLR for BM1 by definition includes an SDC designator that indicates that BM1 is a basic group member 10b, the communications switch SW1 only allows BM1 to make four-digit (group) calls. That is, if BM1 were to attempt to make a ten-digit (non-group) call, SW1 would prevent the call from being further processed and completed.

Additionally, since the HLR for BM1 by definition includes the PDC designator set to indicate that BM1 is a member of a group 10b and since the call is a four-digit call, the communications switch SW1 forwards the BM1 to BM2 four-digit (group) call to the group database 30 for further call processing. Preferably, the group database 30 is associated with a group switch 32 such that the group switch 32 facilitates call switching for the group database 30. Preferably, as part of forwarding the group call from SW1, the group database 30 receives the ten-digit number of BM1 plus the four-digit number of BM2.

Figure 6:
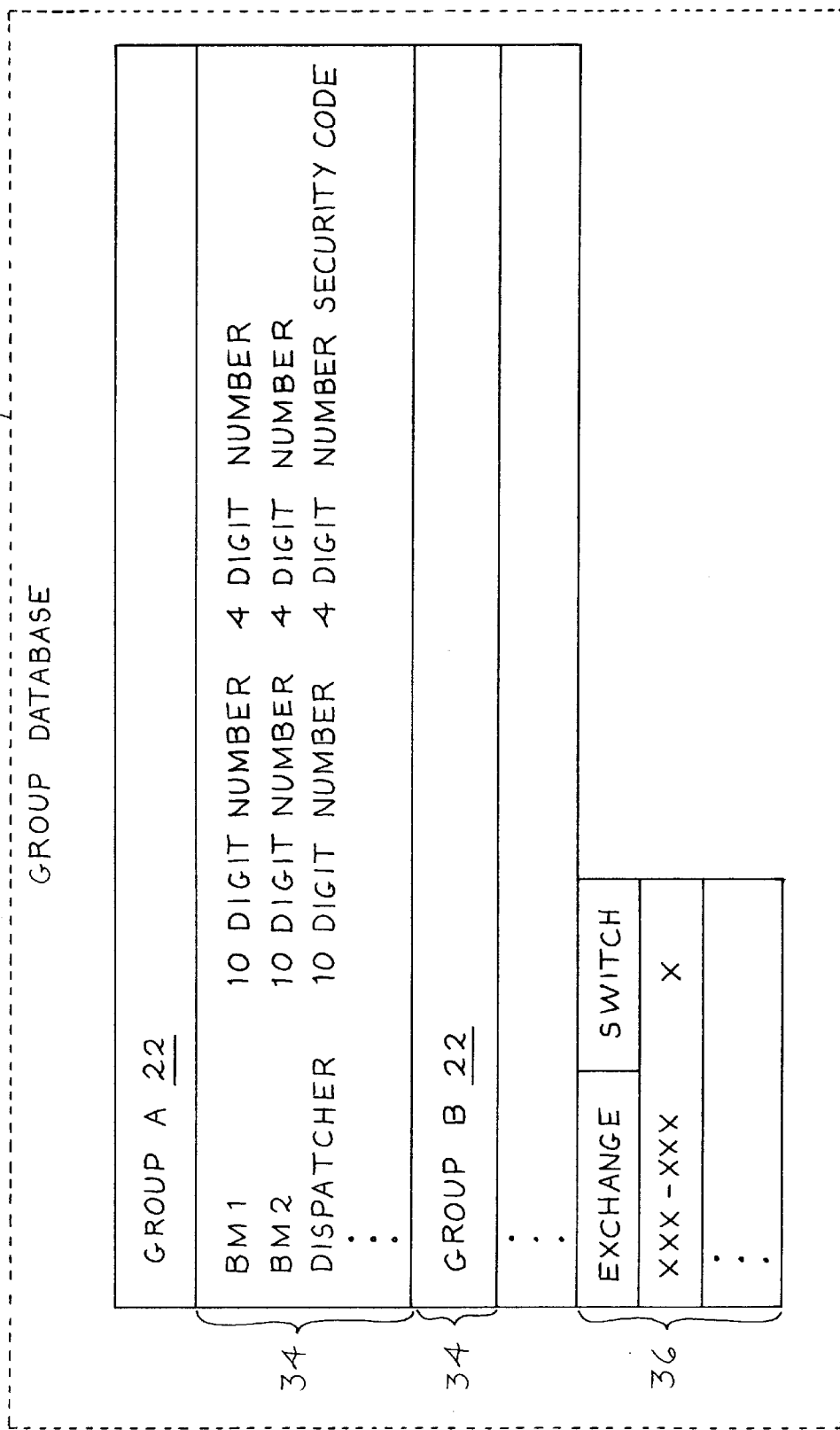
FIG. 6 is a block diagram of the group database shown in FIG. 4 in accordance with the preferred embodiment of the present invention.

Preferably, and referring now to FIG. 6, the group database 30 includes a partition 34 for each group 22 in the cellular telephone system, and each partition 34 includes information on each group member 10b, 10e, 24 in the respective group 22. As seen in FIG. 6, partitions 34 exist for groups A and B, and BM1, BM2, and DISP1 are all in group A. Preferably, and as seen, the group database 30 has the ten-digit number and the four-digit number for each group member 10b, 10e, 24 in each group 22. Accordingly, from the received ten-digit number of BM1, the group database 30 can determine that BM1 is in group A, and from the four-digit number of BM2, the group database can locate the ten-digit number of BM2 within group A.

Since the group database 30 can determine that BM1 is in group A, the group database preferably only allows BM1 to make four-digit (group) calls to other group members 10b, 10e, 24 in group A. That is, if BM1 were to attempt to make a four-digit (group) call to a group member 10b, 10e, 24 in group B or any other group, the group database 30 preferably would prevent the call from being further processed and completed.

Based on the located ten-digit number for BM2, the group switch 32 associated with the group database 30 forwards the call to the home switch for BM2 for further processing in accordance with the ten-digit number for BM2. This is necessary since the home switch for BM2 (SW1 in this example) maintains the HLR 18 which includes the visited switch designator that indicates whether BM2 is registered at its home cellular switch 14 or is visiting another cellular switch 14.

Preferably, and as seen in FIG. 6, each cellular switch 14 is home to a number of cell phone exchanges, and the group database 30 includes an exchange-switch table 36 that lists a home cellular switch 14 for each area code and exchange in the group database 30. Accordingly, based on the area code and exchange in the ten-digit number for BM2, the group database 30 can determine that the home switch for BM2 is SW1. Preferably, when the group call for BM2 is forwarded to SW1, appropriate call information is also forwarded to SW1, including the ten-digit number for BM2.

Based on the ten-digit number for BM2, switch SW1 looks at the HLR 18 for BM2 in DB1. Since BM2 is a basic member 10b of the group 22, the HLR 18 for BM2 by definition has the ICF designator set to forward all calls to BM2 to the group database 30 for further processing. Accordingly, the forwarded call from the group database 30 would normally be switched by SW1 back to the group database 30. As should be understood, this is undesirable since the call to BM2 has already been processed by the group database 30. Accordingly, in the preferred embodiment of the present invention, once the group database 30 processes and forwards a call to a basic member 10b, the group switch 32 must notify the receiving cellular switch 14 (SW1 in this example) to suspend immediate call forwarding for this call only.

Referring again to FIG. 4 and the four-digit (group) call from BM1 to BM2, since the HLR for BM2 indicates that BM2 is visiting SW2, switch SW1 forwards the call to SW2 for further completion. Once SW2 receives the call, the call is completed in the normal fashion.

If BM2 makes a four-digit (group) call to BM1, the call will be handled in the same manner as stated above. However, in such a situation, SW2 must refer to the VLR for BM2 to determine the PDC and SDC designators for BM2.

If in the above scenario BM1 were instead an enhanced member EM1 (not shown), a four-digit (group) call from EM1 to BM2 would cause SW1 to forward the call to the group database 30 for completion in the same manner as stated above. Likewise, if BM2 were instead an enhanced member EM2 (also not shown), a fourdigit (group) call from BM1 to EM2 would cause SW1 to forward the call to the group database 30 for completion in the same manner as stated above. However, it should be noted that the ICF designator is not set for an enhanced member 10e and that immediate call forwarding therefore need not be suspended at any time. If EM1 calls a ten-digit (non-group) number or receives a call from a ten-digit (non-group) number, SW1 would preferably recognize from the HLR 18 for EM1 that EM1 is an enhanced member 10e, would not block the call, and would not forward the call to the group database 30. In such an instance, SW1 would preferably complete the call as if EM1 were not in a group 22.

However, if anyone, group or non-group, employs a communications device to call basic member BM2 by way of the ten-digit number for BM2, the call would be routed to SW1, the home switch for BM2; SW1 would determine that the HLR for BM2 has the ICF designator set; and SW1 would therefore forward the call to the group database 30 for further processing. Preferably, the group database 30 would complete the call in the manner set forth above only if an appropriate security code were entered or if the caller's ten-digit number were recognized as a number of a group member. As should be evident, if the group database 30 can recognize a caller's ten-digit number, a security code need not be required.

Accordingly, a dispatcher member 24 or the like with the security code and/or a recognized ten-digit number would be able to access any basic member 10b of the group 22, but an inappropriate third party without the security code would not be able to access the any such basic member 10b of the group 22. Preferably, any dispatcher can call a group member either directly by dialing the ten-digit number for the group member and then a security code, or by dialing a telephone access number and the four-digit number for the group member.

In a situation where BM1 makes a four-digit call to dispatcher member DISP1, the call is forwarded to the group database 30 in the manner explained above. Thereafter, the group database 30 preferably forwards the call to the land line telephone number for DISP1 by way of the group switch 32 and land line switch LL-SW. As should be understood, since DISP1 is not a cell phone 10 and is not registered with a cellular switch 14, no incoming call forwarding suspension is required.

In the preferred embodiment of the present invention, each cellular switch 14 in a carrier system 11 must be able to recognize that four-digit calls are handled differently than ten-digit calls. Moreover, since multiple carrier systems 11 may have common four-digit numbers for different cell phones 10, it is preferable that each cell phone 10 be assigned to a 'home' carrier system 11, and that four-digit calls from a cell phone 10 be prevented from being completed through cellular switches 14 not associated with the home carrier system 11 of the cell phone 10. Also preferably, and as stated above, by setting the home system only designator in the HLR 18 for each basic member 10b, such basic member 10b is prevented from visiting a cellular switch outside the 'footprint' of the carrier system 11 and obtaining service. However, one skilled in the art will recognize that allowing a basic member 10b to visit a cellular switch outside the 'footprint' of the carrier system 11 may be desirable under certain circumstances, and that such an action is therefore within the spirit and scope of the present invention.

As should be understood, since the code assigned to each group member 10b, 10e, 24 is preferably four digits, a maximum of ten thousand group members spread across multiple groups 22 are allowed per carrier system 11. Of course, one skilled in the art will recognize that if the code is five digits, one hundred thousand group members in the carrier system 11 are allowed, that if the code is three digits, one thousand group members in the carrier system 11 are allowed, etc.

In a preferred embodiment of the present invention, each cellular switch 14 is preferably a Lucent Technologies 5E switch, the group database 30 is an ORYX database designed by Priority Call Management of Wilmington, Mass., and the group switch 32 is an Excel LNX switch from Excel Inc. of Hyannis, Mass. As one skilled in the art will recognize, however, other switches and databases may be employed without departing from the spirit and scope of the present invention.

From the foregoing description, it can be seen that the present invention comprises a new and useful cellular telephone system with pre-defined restricted groups. It will be appreciated by one skilled in the art that changes can be made to the embodiment described above without departing from the broad inventive concepts thereof. For example, in addition to a cellular telephone system, the present invention may also be deployed in other switched communications systems, including wireless systems such as PCS and SMR and wired systems such as the classic land line telephone system. As should be understood, deploying the present invention in such other systems would require minor variations that would be evident to one skilled in the art. It is understood, therefore, that this invention is not limited to the particular embodiments disclosed but is intended to cover modifications within the spirit and scope of the present invention.

We claim:

1. A communications system having a pre-defined calling group with a plurality of members, the system comprising:
   a plurality of personal communication devices (PCDs), each member of the group being assigned one of the PCDs, each PCD having a system ID and a group ID, the system ID and the group ID both having a predetermined characteristic, each system ID having a first variation with respect to the characteristic, each group ID having a second variation with respect to the characteristic, a first member of the group having a first PCD and attempting to contact a second member of the group having a second PCD by entering into the first PCD the group ID of the second PCD;
   a communications switch for allowing the first PCD to access the communications system thereby, the first PCD transmitting information to the communications switch, the transmitted information including the system ID of the first PCD and the group ID of the second PCD;
   a switch database in communication with the communications switch, the switch database including a record for the first PCD, the record including information that the first PCD is assigned to a member of the group, the communications switch locating the record for the first PCD based on the system ID of the first PCD, the communications switch determining based on the record for the first PCD that the first PCD is allowed to contact the second PCD by way of the group ID of the second PCD; and
   a group database in switchable communication with the communications switch, the group database having the system ID and the group ID for the PCD of each member of the group, the communications switch forwarding the attempted contact and the group ID of the second PCD to the group database for further processing, the group database determining that the group ID of the second PCD is located therein, locating the system ID of the second PCD based on the group ID of the second PCD, and forwarding the attempted contact and the system ID of the second PCD to an appropriate communications switch for further processing.

2. The communications system of claim 1 for restricting communications within each of a plurality of pre-defined groups, each group including restricted members and non-restricted members, each restricted member of a first group being restricted to contacting non-restricted members and other restricted members within the first group, wherein the group database has a partition for each group, each partition including the system ID and the group ID for the PCD of each member of the respective group, the communications switch forwarding the attempted contact, the system ID of the first PCD, and the group ID of the second PCD to the group database for further processing, the group database locating the partition for the group of the first member based on the system ID of the first PCD, determining that the group ID of the second PCD is in the partition for the group of the first member, locating the system ID of the second PCD based on the group ID of the second PCD, and forwarding the attempted contact and the system ID of the second PCD to an appropriate communications switch for further processing.

3. The communications system of claim 1 wherein the members of the group include restricted members and non-restricted members, each restricted member being restricted to contacting non-restricted members and other restricted members, the first member of the group being a restricted member, the record for the first PCD in the switch database including information that the first PCD is assigned to a restricted member of the group, the communications switch locating the record for the first PCD based on the system ID of the first PCD, the communications switch determining that the attempted contact by the first, restricted PCD is allowed to proceed since the group ID of the second PCD has the second variation.

4. The communications system of claim 3 wherein each non-restricted member may contact restricted members, other non-restricted members, and non-group individuals, each non-group individual having a non-group PCD, each non-group PCD having an ID, a non-restricted member of the group having a non-restricted PCD and attempting to contact a non-group individual having a non-group PCD by entering into the non-restricted PCD the ID of the non-group PCD;
   the communications switch for allowing the non-restricted PCD to access the communications system thereby, the non-restricted PCD transmitting information to the communications switch, the transmitted information including the system ID of the non-restricted PCD and the ID of the non-group PCD;

the switch database including a record for the non-restricted PCD, the record including information that the non-restricted PCD is assigned to a non-restricted member of the group, the communications switch locating the record for the non-restricted PCD based on the system ID of the non-restricted PCD, the communications switch determining based on the record for the non-restricted PCD that the non-restricted PCD is authorized to contact the non-group individual by way of the ID of the non-group PCD; and the communications switch forwarding the attempted contact and the ID of the non-group PCD to an appropriate communications switch for further processing.

5. The communications system of claim 1 wherein the characteristic is a number of digits, each system ID has ten digits, and each group ID has a number of digits other than ten digits.

6. In a communications system, a calling group having a plurality of members including restricted members and non-restricted members, each restricted member being restricted to contacting non-restricted members and other restricted members within the group, each non-restricted member being able to contact restricted members, other non-restricted members, and non-group individuals, each member of the group being assigned a personal communication device (PCD), each PCD having a system ID and a group ID, the system ID and the group ID both having a predetermined characteristic, each system ID having a first variation with respect to the characteristic, each group ID having a second variation with respect to the characteristic, a first member of the group having a first PCD and attempting to contact an individual having a communications device by entering into the first PCD a number of the communications device, the communications system having a communications switch for allowing the first PCD to access the communications system thereby, the first PCD transmitting information to the communications switch, the transmitted information including the system ID of the first PCD and the number of the communications device, the communications system also having a switch database in communication with the communications switch, the switch database including a record for the first PCD, the record including a first designator designating that the first PCD is assigned to a member of the group and a second designator indicating whether the first PCD is assigned to a restricted member or a non-restricted member, the communications switch locating the record for the first PCD based on the system ID of the first PCD, the communications switch, if determining based on the record for the first PCD that the first PCD is assigned to a restricted member, allowing the attempted contact to proceed if the number of the communications device has the second variation, the communications switch, if determining based on the record for the first PCD that the first PCD is assigned to a non-restricted member, allowing the attempted contact to proceed if the number of the communications device has the first or the second variation, the communications switch, if determining based on the record for the first PCD that the first PCD is a non-restricted member and if the number of the communications device has the first variation, forwarding the attempted contact and the number of the communications device to an appropriate communications switch for further processing, the communications system also having a group database in switchable communication with the communications switch, the group database having the system ID and the group ID for the PCD of each member of the group, the communications switch, if the number of the communications device has the second variation, forwarding the attempted contact and the number of the communications device to the group database for further processing, the group database, if the number of the communications device is located therein as a group ID, determining that the individual having the communications device with the number thereof is a member of the group having a PCD, locating the system ID of the PCD of the individual based on the group ID of the PCD of the individual, and forwarding the attempted contact and the system ID of the PCD of the individual to an appropriate communications switch for further processing.

7. In the communications system of claim 6, a plurality of the calling groups, each restricted member of a first group being restricted to contacting non-restricted members and other restricted members within the first group, wherein the group database has a partition for each group, each partition including the system ID and the group ID for the PCD of each member of the respective group, the communications switch, if the number of the communications device has the second variation, forwarding the attempted contact, the first number of the first PCD, and the number of the communications device to the group database for further processing, the group database locating the partition for the group of the first member based on the system ID of the first PCD, the group database, if the number of the communications device is located therein as a group ID in the partition for the group of the first member, determining that the individual having the communications device with the number thereof is a member of the group of the first member and that the individual has a PCD, locating the system ID of the PCD of the individual based on the group ID of the PCD of the individual, and forwarding the attempted contact and the system ID of the PCD of the individual to an appropriate communications switch for further processing.

8. The communications system of claim 6 wherein the characteristic is a number of digits, each system ID has ten digits, and each group ID has a number of digits other than ten digits.

9. A method of communicating within a pre-defined calling group having a plurality of members, the method comprising the steps of:

assigning a personal communication device (PCD) to each member of the group;

assigning a system ID and a group ID to each PCD, the system ID and the group ID both having a predetermined characteristic, each system ID having a first variation with respect to the characteristic, each group ID having a second variation with respect to the characteristic;

entering, into a first PCD of a first member of the group, the group ID of a second PCD of a second member of the group in an attempt to contact the second member;

allowing the first PCD to access a communications system by way of a communications switch;

transmitting, by the first PCD, information to the communications switch, the transmitted information including the system ID of the first PCD and the group ID of the second PCD;

locating, by the communications switch, a record for the first PCD in a switch database based on the system ID of the first PCD, the record including information that the first PCD is assigned to a member of the group;

determining, by the communications switch, based on the record for the first PCD, that the first PCD is allowed to contact the second PCD by way of the group ID of the second PCD;

forwarding, by the communications switch, the attempted contact and the group ID of the second PCD to a group database for further processing, the group database having the system ID and the group ID for the PCD of each member of the group;

determining, by the group database, that the group ID of the second PCD is located therein;

locating, by the group database, the system ID of the second PCD based on the group ID of the second PCD; and forwarding, by the group database, the attempted contact and the system ID of the second PCD to an appropriate communications switch for further processing.

10. The method of claim 9 for each of a plurality of pre-defined groups, each group including restricted members and non-restricted members, each restricted member of a first group being restricted to contacting non-restricted members and other restricted members within the first group, the method comprising the steps of:

forwarding, by the communications switch, the attempted contact, the system ID of the first PCD, and the group ID of the second PCD to the group database for further processing, the group database having a partition for each group, each partition including the system ID and the group ID for the PCD of each member of the respective group;

locating, by the group database, the partition for the group of the first member based on the system ID of the first PCD;

determining, by the group database, that the group ID of the second PCD is in the partition for the group of the first member;

locating, by the group database, the system ID of the second PCD based on the group ID of the second PCD; and forwarding, by the group database, the attempted contact and the system ID of the second PCD to an appropriate communications switch for further processing.

11. The method of claim 9 wherein the members of the group include restricted members and non-restricted members, each restricted member being restricted to contacting non-restricted members and other restricted members, the first member of the group being a restricted member, the method comprising the steps of:

locating, by the communications switch, a record for the first PCD in the switch database based on the system ID of the first PCD, the record including information that the first PCD is assigned to a restricted member of the group;

determining, by the communications switch, based on the record for the first PCD, that the attempted contact by the first, restricted PCD is allowed to proceed since the group ID of the second PCD has the second variation.

12. The method of claim 11 wherein each non-restricted member may contact restricted members, other non-restricted members, and non-group individuals, each non-group individual having a non-group PCD, each non-group PCD having an ID, a non-restricted member of the group having a non-restricted PCD, the method comprising the steps of:

entering into the non-restricted PCD the ID of a non-group PCD in an attempt to contact a non-group individual having the non-group PCD;

allowing the non-restricted PCD to access a communications system by way of a communications switch;

transmitting, by the non-restricted PCD, information to the communications switch, the transmitted information including the system ID of the non-restricted PCD and the ID of the non-group PCD;

locating, by the communications switch, a record for the non-restricted PCD in the switch database based on the system ID of the non-restricted PCD, the record including information that the non-restricted PCD is assigned to a non-restricted member of the group;

determining, by the communications switch, based on the record for the non-restricted PCD, that the non-restricted PCD is authorized to contact the non-group individual by way of the ID of the non-group PCD;

forwarding, by the communications switch, the attempted contact and the ID of the non-group PCD to an appropriate communications switch for further processing.

13. The method of claim 9 comprising the step of assigning the system ID and the group ID to each PCD, wherein the characteristic is a number of digits, each system ID has ten digits, and each group ID has a number of digits other than ten digits.

14. A method of communicating within a calling group having a plurality of members including restricted members and non-restricted members, each restricted member being restricted to contacting non-restricted members and other restricted members within the group, each non-restricted member being able to contact restricted members, other non-restricted members, and non-group individuals, the method comprising the steps of:

assigning a personal communication device (PCD) to each member of the group;

assigning a system ID and a group ID to each PCD, the system ID and the group ID both having a predetermined characteristic, each system ID having a first variation with respect to the characteristic, each group ID having a second variation with respect to the characteristic;

entering, into a first PCD of a first member of the group, a number of the communications device of an individual in an attempt to contact the individual;

allowing the first PCD to access a communications system by way of a communications switch;

transmitting, by the first PCD, information to the communications switch, the transmitted information including the system ID of the first PCD and the number of the communications device;

locating, by the communications switch, a record for the first PCD in a switch database based on the system ID of the first PCD, the record including a first designator designating that the first PCD is assigned to a member of the group and a second designator indicating whether the first PCD is assigned to a restricted member or a non-restricted member;

allowing, by the communications switch, the attempted contact to proceed if the communications switch determines based on the record for the first PCD that the first PCD is assigned to a restricted member and if the number of the communications device has the second variation;

allowing, by the communications switch, the attempted contact to proceed if the communications switch determines based on the record for the first PCD that the first PCD is assigned to a non-restricted member and if the number of the communications device has the first or the second variation;

forwarding, by the communications switch, the attempted contact and the number of the communications device to an appropriate communications switch for further processing, if the first PCD is a non-restricted member and if the number of the communications device has the first variation;

forwarding, by the communications switch, the attempted contact and the number of the communications device to a group database for further processing, the group database having the system ID and the group ID for the PCD of each member of the group;

determining, by the group database, that the individual having the communications device with the number thereof is a member of the group having a PCD if the number of the communications device is located therein as a group ID;

locating, by the group database, the system ID of the PCD of the individual based on the group ID of the PCD of the individual; and forwarding, by the group database, the attempted contact and the system ID of the PCD of the individual to an appropriate communications switch for further processing.

15. The method of claim 14 for each of a plurality of calling groups, each restricted member of a first group being restricted to contacting non-restricted members and other restricted members within the first group, the method comprising the steps of:

forwarding, by the communications switch, the attempted contact, the first number of the first PCD, and the number of the communications device to the group database for further processing if the number of the communications device has the second variation, the group database having a partition for each group, each partition including the system ID and the group ID for the PCD of each member of the respective group;

locating, by the group database, the partition for the group of the first member based on the system ID of the first PCD;

determining, by the group database, that the individual having the communications device with the number thereof is a member of the group of the first member and that the individual has a PCD if the number of the communications device is located therein as a group ID in the partition for the group of the first member;

locating, by the group database, the system ID of the PCD of the individual based on the group ID of the PCD of the individual; and forwarding, by the group database, the attempted contact and the system ID of the PCD of the individual to an appropriate communications switch for further processing.

16. The method of claim 14 comprising the step of assigning the system ID and the group ID to each PCD, wherein the characteristic is a number of digits, each system ID has ten digits, and each group ID has a number of digits other than ten digits.

17. A communications system having a pre-defined calling group with a plurality of members, each member having a communications device with an ID, the members of the group including restricted members, each restricted member being restricted from being contacted by a non-group individual, the non-group individual having a first communications device (CD1) with a first ID (ID1) and attempting to contact a restricted member of the group having a second communications device (CD2) with a second ID (ID2) by entering ID2 into CD1, the system comprising:

a communications switch for allowing CD2 to access the communications system thereby, CD1 being switchably connected to and transmitting information to the communications switch, the transmitted information including ID2 of CD2 and ID1 of CD1;

a switch database in communication with the communications switch, the switch database including a record for CD2, the record including information that CD2 is assigned to a restricted member of the group, the communications switch locating the record for CD2 based on ID2; and a group database in switchable communication with the communications switch, the group database having the ID of the communications device of each member of the group, the communications switch determining based on the record for CD2 that the attempted contact is to be forwarded to the group database for further processing since the record for CD2 includes the information that CD2 is assigned to a restricted member of the group, the forwarded attempted contact including information on the ID1 of CD1, the group database preventing the attempted contact from being completed upon determining that ID1 of CD1 is not located therein.

18. A method of restricting communications to a restricted member of a pre-defined calling group with a plurality of members, each member having a communications device with an ID, the restricted member being restricted from being contacted by a non-group individual, the non-group individual having a first communications device (CD1) with a first ID (ID1) and attempting to contact a restricted member of the group having a second communications device (CD2) with a second ID (ID2) by entering ID2 into CD1, the method comprising the steps of:

allowing CD2 to access a communications system by way of a communications switch;

switchably connecting CD1 to the communications switch;

transmitting, by CD1, information to communications switch, the transmitted information including ID2 of CD2 and ID1 of CD1;

locating, by the communications switch, based on ID2, a record for CD2 in a switch database in communication with the communications switch, the record including information that CD2 is assigned to a restricted member of the group;

determining, by the communications switch, based on the record for CD2, that the attempted contact is to be forwarded to a group database for further processing since the record for CD2 includes the information that CD2 is assigned to a restricted member of the group, the group database being in switchable communication with the communications switch and having the ID of the communications device of each member of the group, the forwarded attempted contact including information on the ID1 of CD1; and preventing, by the group database, the attempted contact from being completed upon the group database determining that ID1 of CD1 is not located therein.

* * * * *

UNITED STATES PATENT AND TRADEMARK OFFICE
CERTIFICATE OF CORRECTION

PATENT NO. : 6,073,023
DATED : June 6, 2000
INVENTOR(S) : Karen Tirabassi et al.

It is certified that error appears in the above-identified patent and that said Letters Patent is hereby corrected as shown below:

<u>On the Title Page</u>

In column 1, item [73], delete "Comcast Cellular Communications, Inc., Wayne, Pa." and substitute --SBC Technology Resources, Inc., Austin, Texas-- in its place.

Signed and Sealed this

Fifteenth Day of May, 2001

Attest:

NICHOLAS P. GODICI

Attesting Officer    Acting Director of the United States Patent and Trademark Office